(12) United States Patent
Yamada et al.

(10) Patent No.: US 12,077,365 B2
(45) Date of Patent: Sep. 3, 2024

(54) MEASURING DEVICE AND CONTAINER WITH MEASURING DEVICE

(71) Applicant: TAISEI KAKO CO., LTD., Osaka (JP)

(72) Inventors: Hiroshi Yamada, Osaka (JP); Yukihiro Ogawa, Osaka (JP)

(73) Assignee: TAISEI KAKO CO., LTD., Osaka (JP)

( * ) Notice: Subject to any disclaimer, the term of this patent is extended or adjusted under 35 U.S.C. 154(b) by 106 days.

(21) Appl. No.: 17/787,292

(22) PCT Filed: Jul. 29, 2021

(86) PCT No.: PCT/JP2021/028072
§ 371 (c)(1),
(2) Date: Jun. 18, 2022

(87) PCT Pub. No.: WO2022/030352
PCT Pub. Date: Feb. 10, 2022

(65) Prior Publication Data
US 2023/0017669 A1    Jan. 19, 2023

(30) Foreign Application Priority Data
Aug. 7, 2020   (JP) ................. 2020-135267

(51) Int. Cl.
  *B65D 83/04*  (2006.01)
  *A61J 7/02*   (2006.01)
  *G01F 11/24*  (2006.01)
(52) U.S. Cl.
  CPC .......... *B65D 83/04* (2013.01); *A61J 7/02* (2013.01); *G01F 11/24* (2013.01); *B65D 2583/0472* (2013.01)

(58) Field of Classification Search
  CPC ... A61J 7/02; B65D 83/04; B65D 2583/0472; G01F 11/24
  (Continued)

(56) References Cited

U.S. PATENT DOCUMENTS 5,667,109 A   9/1997  Yu-Mei
7,100,797 B2 * 9/2006  Kahn ................. B65D 83/0409
                                                221/265

(Continued)

FOREIGN PATENT DOCUMENTS

CN   202437722 U  *  9/2012
JP   S58-63529 U     4/1983

(Continued)

OTHER PUBLICATIONS

International Search Report for PCT/JP2021/028072 (now published as WO2022/030352) mailed on Oct. 12, 2021 and its English translation from WIPO.

(Continued)

*Primary Examiner* — Bryon P Gehman
(74) *Attorney, Agent, or Firm* — Ladas & Parry, LLP

(57) ABSTRACT

Provided is a measuring device including: a tablet measuring part that includes a plurality of housing parts that are each configured to house one tablet; a measuring-number selecting part that enables to select a measuring number of tablets by selecting a number of housing parts available for housing tablets out of the plurality of the housing parts; and a measuring-number fixing part that locks the measuring number selecting part to prevent the measuring number selected by the measuring-number selecting part from being changed.

6 Claims, 15 Drawing Sheets

(58) Field of Classification Search
USPC .............................................. 206/459.5, 540
See application file for complete search history.

(56) References Cited

U.S. PATENT DOCUMENTS

| 8,622,241 | B2 * | 1/2014 | Geboers | ................ | A61J 7/0481 |
| | | | | | 221/265 |
| 10,294,010 | B2 * | 5/2019 | Desset-Brethes | ...... | B65D 83/04 |
| 2015/0151898 | A1 | 6/2015 | Sabine et al. | | |
| 2020/0368112 | A1 | 11/2020 | Stiplastics | | |

FOREIGN PATENT DOCUMENTS

| JP | 11208702 A | * | 8/1999 | ......... B65D 83/0409 |
| JP | 2008-30788 | | 2/2008 | |
| JP | 6225173 | | 11/2017 | |
| JP | 2020-97427 | | 6/2020 | |
| WO | 2019150027 A1 | | 8/2019 | |

OTHER PUBLICATIONS

Written Opinion for PCT/JP2021/028072 (now published as WO2022/030352) mailed on Oct. 12, 2021 and its English machine translation.
International Preliminary Report on Patentability (Chapter I) from PCT/JP2021/028072 dated Feb. 7, 2023, with its English translation from WIPO.
Extended European Search Report from corresponding EPO Application No. 21852441.1 dated Oct. 27, 2023.

* cited by examiner

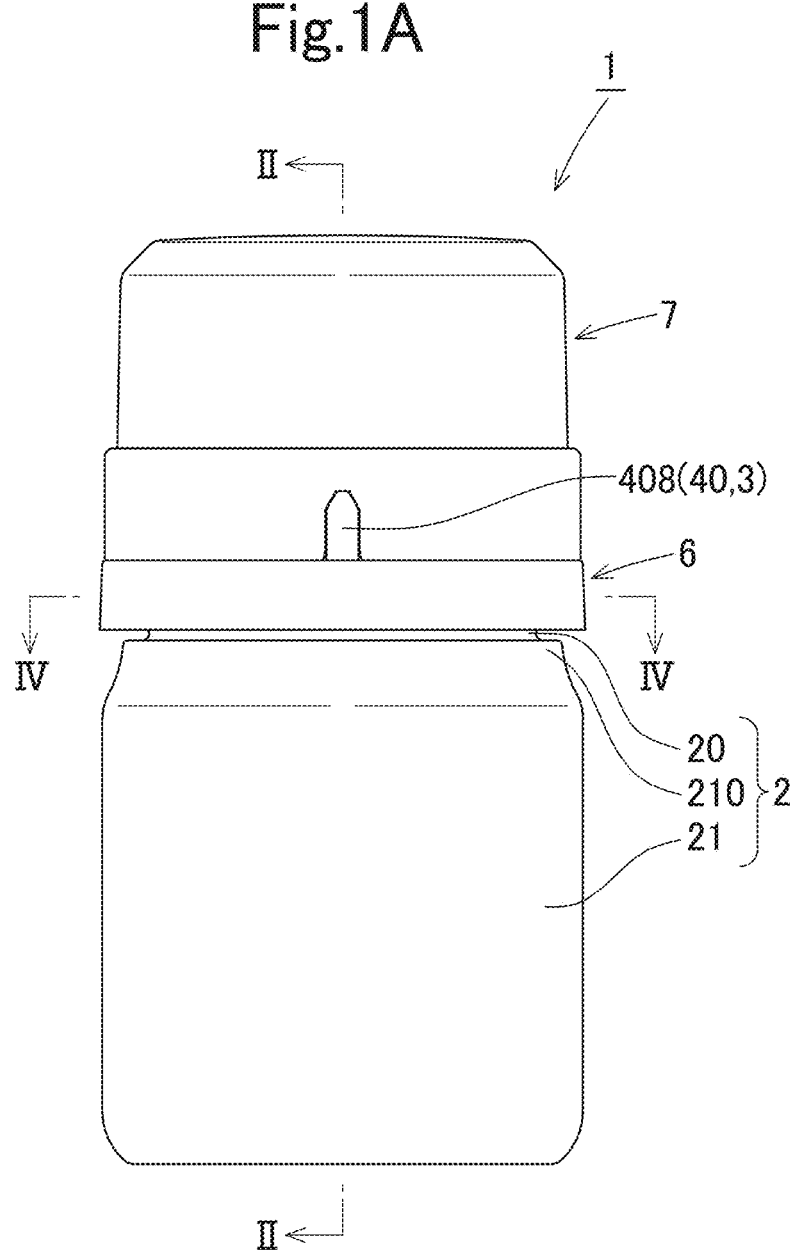

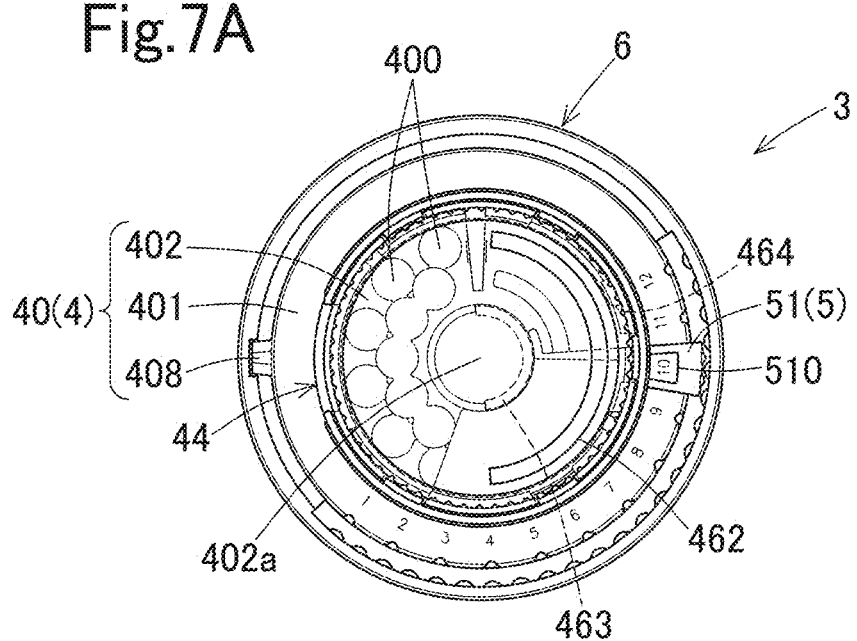
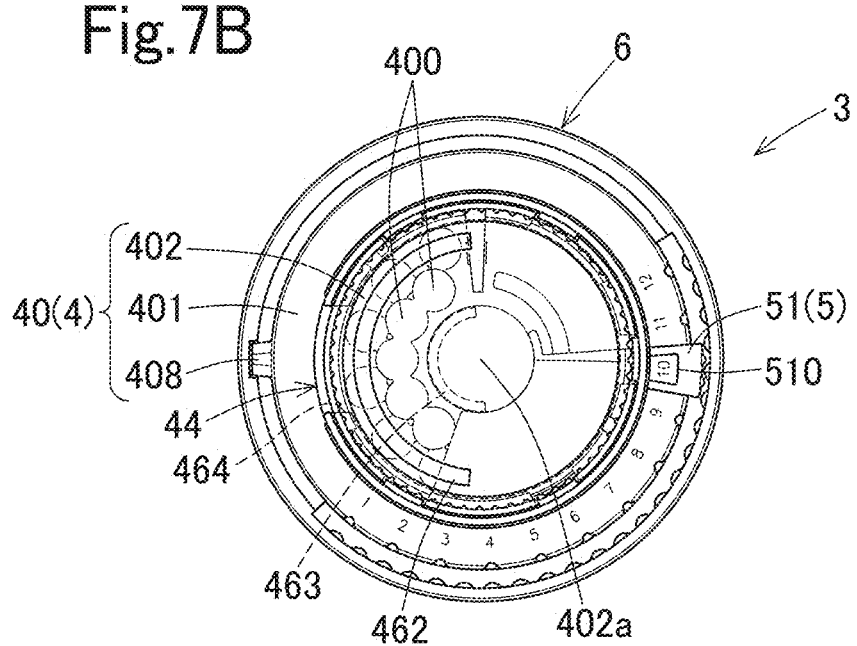

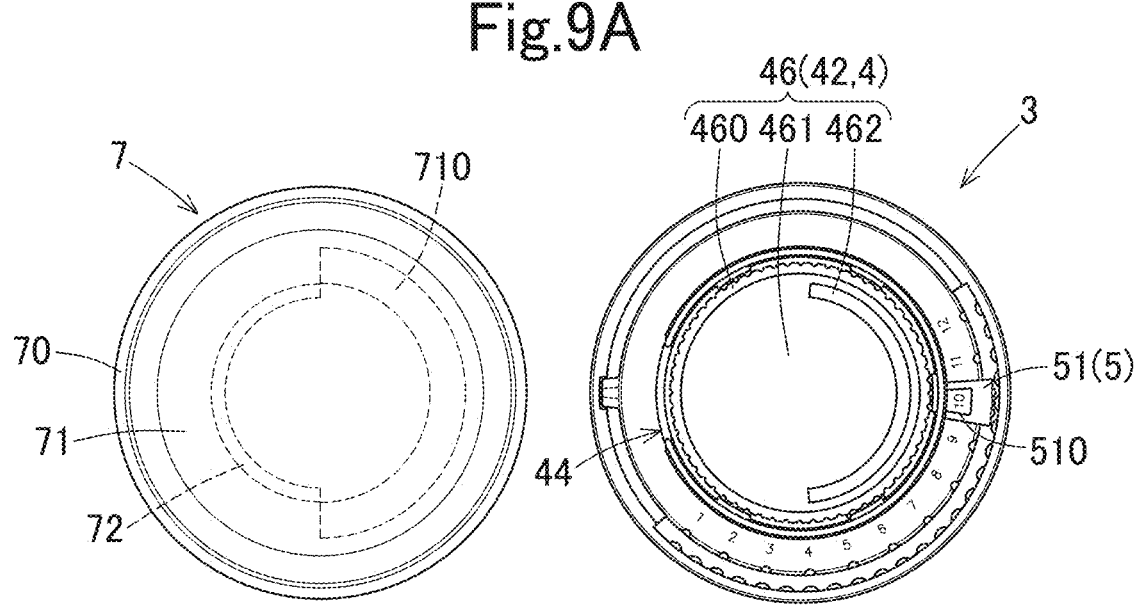
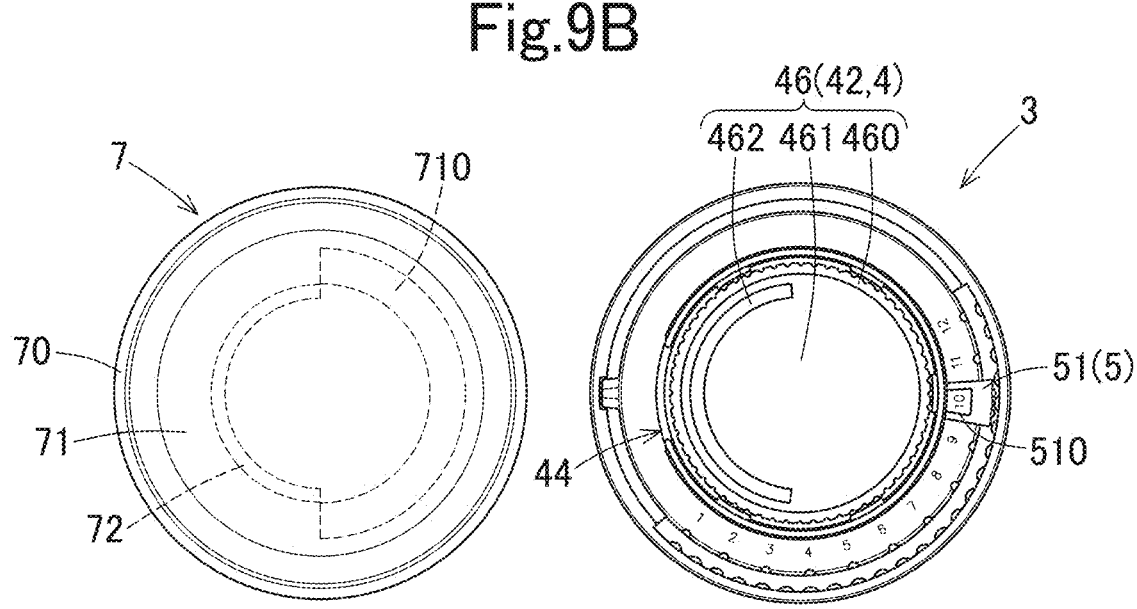

MEASURING DEVICE AND CONTAINER WITH MEASURING DEVICE

CROSS-REFERENCE TO RELATED APPLICATIONS

This application is the US national phase filing of PCT Application No. PCT/JP2021/028072, which claims priority to Japanese Patent Application No. 2020-135267, the disclosures of which are incorporated herein by reference in their entireties.

FIELD

The present invention relates to a measuring device capable of measuring tablets and a container with the measuring device.

BACKGROUND

A medicine housing device is conventionally known as a container with a measuring device capable of measuring the required number of tablets (Patent Literature 1). As shown in FIG. 14, a medicine housing device 901 includes a container body 902 having a bottle shape to house the tablets, and a dispensing device 903 as a measuring device to be attached to a top part of the container body 902.

The dispensing device 903 includes a chamber 904 having a bottomed cylindrical shape, an inlet 943 through which the tablets are introduced from the inside of the container body 902 into the chamber 904, a movable baffle 905 that covers substantially the half of a bottom plate of the chamber 904, and an outlet 944 through which the tablets are discharged from the chamber 904 to the outside. A plurality of holding sections 940 that allow the tablets to respectively fit thereinto are provided on the top side of the bottom plate of the chamber 904. The movable baffle 905 can be rotated relative to the chamber 904 around a cylindrical axis of the chamber 904 as the center axis. The movable baffle 905 is rotated to change the position of the movable baffle 905 in a circumferential direction to thereby allow the movable baffle 905 to cover or expose the holding sections 940 of the chamber 904.

The medicine housing device 901 is used in the case where, for example, a patient measures a large number of tablets in the prescribed dose. Specifically, the patient rotates the movable baffle 905 to expose a desired number of the holding sections 940 (i.e., corresponding to the number of tablets in the prescribed dose), and opens the inlet 943 with the outlet 944 kept closed to thereby introduce the tablets from the container body 902 into the chamber 904. Next, the patient places the tablets in all the exposed holding sections 940 and then opens the outlet 944 with the inlet 943 kept closed so that the patient can take out the tablets from the chamber 904. Thus, the medicine housing device 901 makes it possible to freely set the number of tablets to be measured by the dispensing device 903 and take out the desired number of tablets.

CITATION LIST

Patent Literature

Patent Literature 1: JP 6225173 B

SUMMARY

Technical Problem

The medicine housing device makes it possible to freely change the number of tablets to be measured and thus enables the patient to freely set the number of tablets (i.e., the number of the tablets to be dosed).

However, for example, even in the case where a pharmacist or other pharmacy personnel prepares the dose for the tablets according to his or her individual prescription, a patient may change the number of tablets to be measured by his or her arbitrary decision at the time of administration without following the prescription. In this case, there is a risk that an appropriate number of tablets on the basis of the prescription are not taken by the patient.

It is an object of the present invention to provide a measuring device and a container with the measuring device that make it possible to select the number of tablets such as medicines in a tablet form to be measured and allow a user to follow the dosage by taking the appropriate number of tablets.

Solution to Problem

A measuring device of the present invention includes: a tablet measuring part that includes a plurality of housing parts that are each configured to house one tablet; a measuring-number selecting part that enables to select a measuring number of tablets by selecting the number of housing parts available for housing tablets out of the plurality of the housing parts; and a measuring-number fixing part that locks the measuring-number selecting part to prevent the measuring number selected by the measuring-number selecting part from being changed.

The measuring device can be configured such that the measuring-number selecting part is configured to move relative to the tablet measuring part to select the measuring number, and the measuring-number fixing part is configured to be attached to the tablet measuring part to restrict movement of the measuring-number selecting part to thereby fix the measuring number.

The measuring device can be configured such that the measuring-number fixing part is configured to be attached to the tablet measuring part while being held in engagement with the measuring-number selecting part and being held in immovable engagement with the tablet measuring part, to thereby restrict the selection of the measuring number by the measuring-number selecting part.

The measuring device can be configured such that the tablet measuring part is configured to be attached to a container body that houses tablets, and the measuring-number fixing part is disposed between the tablet measuring part and the container body in a state where the tablet measuring part is attached to the container body.

A container with a measuring device of the present invention includes: a container body that houses tablets; and a measuring device that is attached to the container body, in which the measuring device is the measuring device described above.

A container with a measuring device of the present invention includes: a measuring device that measures tablets; and a container body that is attached with the measuring device and houses tablets, the measuring device comprising a plurality of housing parts that are each configured to house one tablet, and a measuring-number selecting part that enables to select a measuring number of tablets by selecting the number of housing parts in open state out of the plurality of the housing parts, and the container body including a measuring-number fixing part that locks the measuring-number selecting part to prevent the measuring number selected by the measuring-number selecting part from being changed.

BRIEF DESCRIPTION OF DRAWINGS

FIG. 1A is a side view of a container with a measuring device according to an embodiment.

FIG. 7A is a schematic view for explaining a state where a second defining part of the measuring device is disposed at a measurement position.

FIG. 7B is a schematic view for explaining a state where the second defining part of the measuring device is disposed at a take-out position.

FIG. 9A is a schematic view for explaining a state where an overcap of the measuring device is fittable to the second defining part.

FIG. 9B is a schematic view for explaining a state where the overcap of the measuring device is not fittable to the second defining part.

DESCRIPTION OF EMBODIMENTS

An embodiment of the present invention will be hereinafter described with reference to FIG. 1 to FIG. 10. A container with a measuring device according to this embodiment is used when a required number of tablets are to be prepared. For example, a parent of a pediatric patient who handles tablets on a routine basis is assumed as an intended user.

Figure 1B:
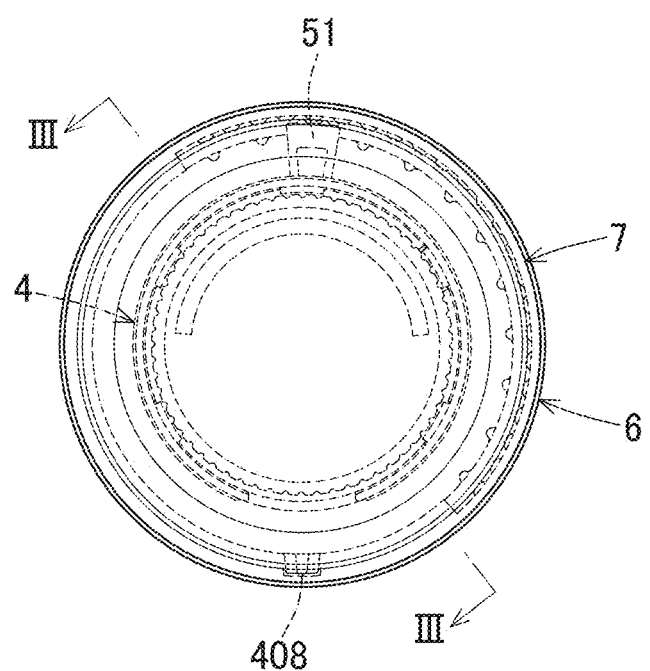
FIG. 1B is a plan view of the container with the measuring device.

As shown in FIG. 1A, a measuring device-equipped container 1 includes a container body 2 and a measuring device 3 to be attached to the container body 2.

The container body 2 is a member for housing tablets. The container body 2 has, for example, a bottomed cylindrical shape. Specifically, the container body 2 is a bottle. The container body 2 of this embodiment has a mouth 20 that is located on a top side and a housing body 21 that is continued with the mouth 20 and has an outer diameter larger than that of the mouth 20.

Figure 2:
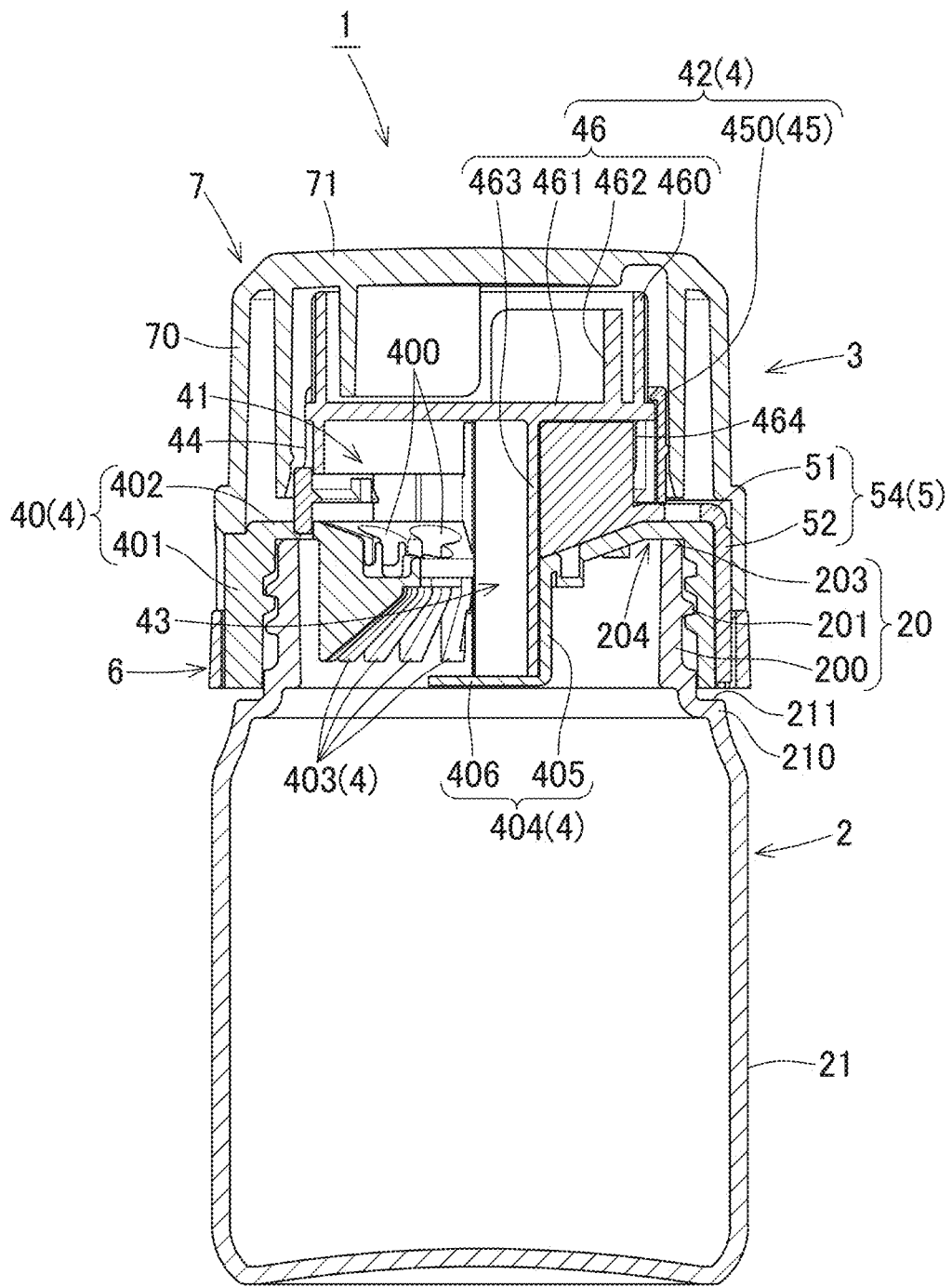
FIG. 2 is a cross section viewed in the direction of the arrows II-II in FIG. 1A.
Figure 3:
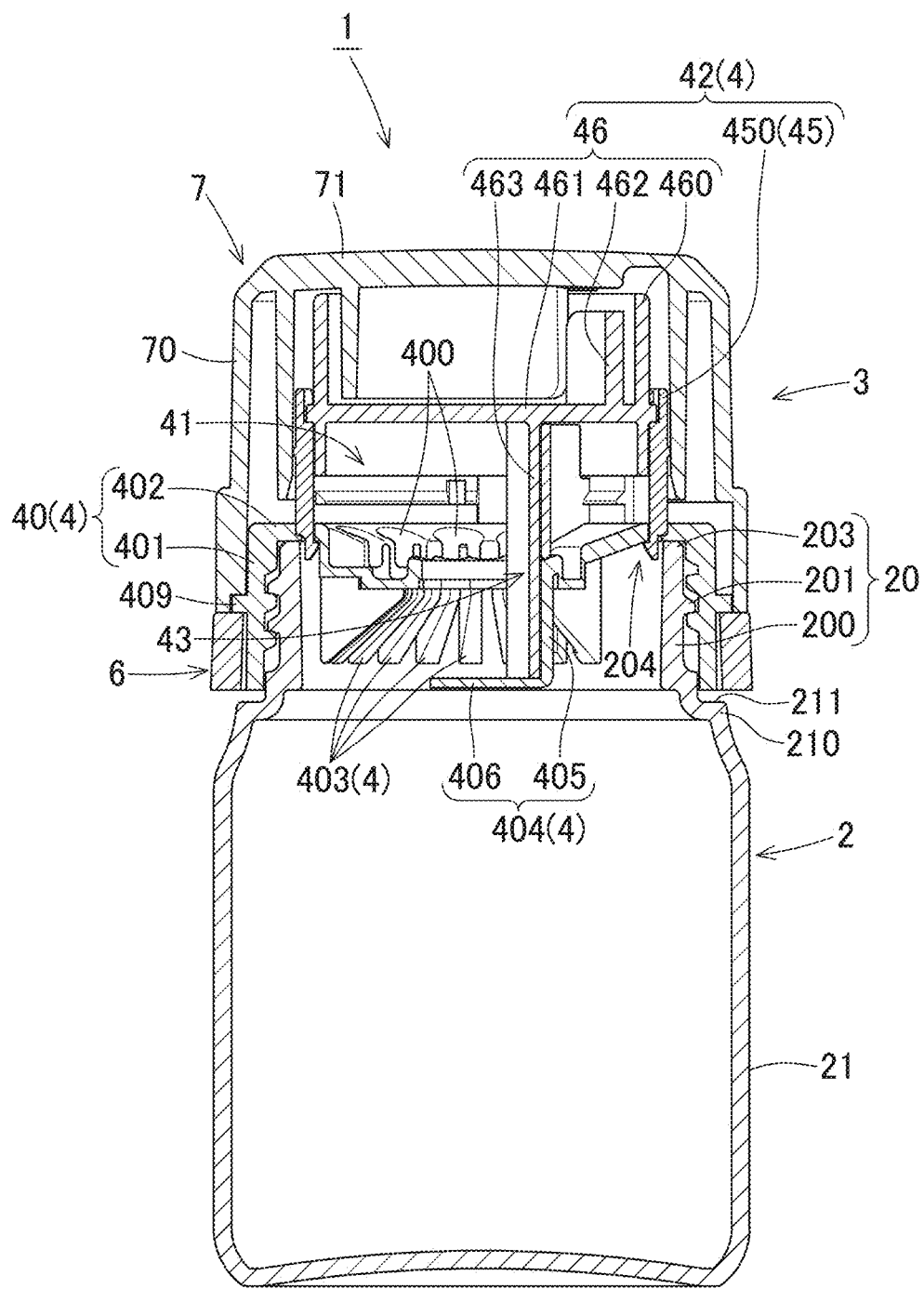
FIG. 3 is a cross section viewed in the direction of the arrows in FIG. 1B.
Figure 5:
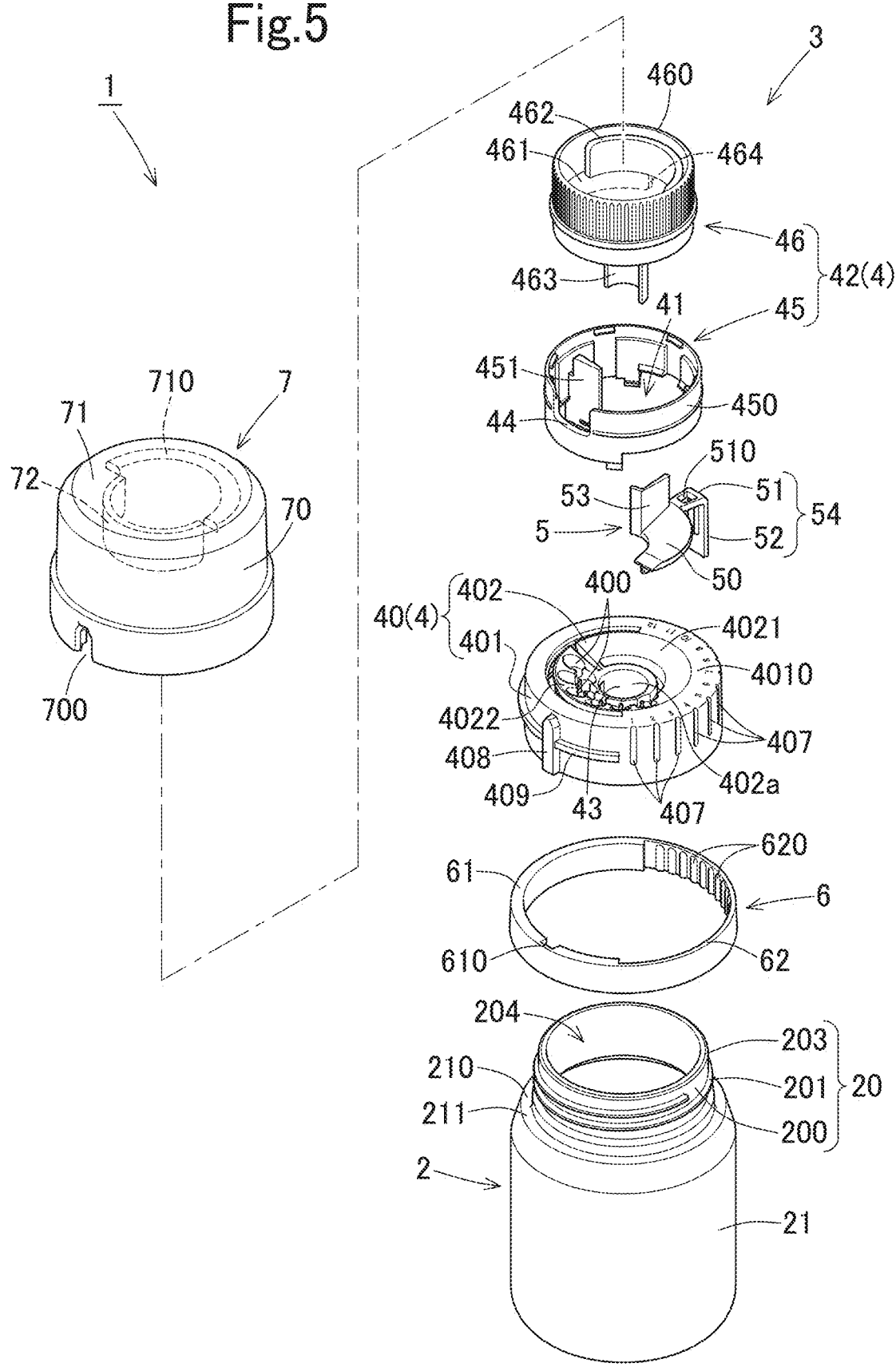
FIG. 5 is an exploded perspective view of the container with the measuring device.

The mouth 20 is an outlet through which tablets as a content are taken out from the container body 2. The mouth 20 has a substantially cylindrical shape as shown in FIG. 2, FIG. 3, and FIG. 5. The mouth 20 includes, for example, a cylindrical mouth body 200 and a container screw part 201 that is a screw provided on the periphery of the mouth body 200.

The mouth body 200 of this embodiment has, for example, a cylindrical shape with a uniform diameter. An end edge 203 located on the top side of the mouth body 200 defines an opening 204 of the mouth 20.

Hereinafter, a direction in which the mouth 20 extends, that is, a height direction of the mouth 20 (i.e., a vertical direction in FIG. 1A, FIG. 2, and FIG. 5) will be simply referred to as "the vertical direction". A direction toward the extended end of the mouth 20 will be also referred to as "upward". A direction opposite to the direction toward the extended end of the mouth 20 (i.e., a direction toward a proximal end of the mouth 20) will be referred to as "downward".

The housing body 21 has a shoulder part 210 that is continued with the mouth 20. An upper surface 211 of the shoulder part 210 is, for example, a flat surface.

The measuring device 3 is a member that makes it possible to measure and take out a desired number of tablets among a plurality of tablets housed in the container body 2. The measuring device 3 includes a tablet measuring part 4 that measures tablets, a measuring-number selecting part 5 that enables to select the number of tablets to be measured, and a measuring-number fixing part 6 that is configured to lock the measuring-number selecting part to prevent the measuring number selected by the measuring-number selecting part 5 from being changed. The measuring device 3 of this embodiment includes an overcap 7 that can protect the tablet measuring part 4 by being attached to the tablet measuring part 4.

The tablet measuring part 4 is a member including a plurality of housing parts 400 that are each configured to house one tablet. The tablet measuring part 4 of this embodiment is a substantially cylindrical member.

Further, the tablet measuring part 4 is configured to be attached to the container body 2. That is, the tablet measuring part 4 is provided as a separate member from the container body 2. Moreover, the measuring-number fixing part 6 is detachably attached to the tablet measuring part 4.

The tablet measuring part 4 of this embodiment includes a measurement body part 40 in which the plurality of the housing parts 400 are provided. The tablet measuring part 4 includes a measurement defining assembly 42 that defines a measuring space 41 that houses the tablets at the time of measurement. The tablet measuring part 4 has an inlet 43 through which the tablets enter the measuring space 41 from the container body 2, and an outlet 44 through which the tablets exit from the measuring space 41 to the outside (see FIG. 5).

In the tablet measuring part 4 of this embodiment, the inlet 43 is provided inside the tablet measuring part 4. In the tablet measuring part 4, the outlet 44 is provided in a side of the tablet measuring part 4.

The shape of the measurement body part 40 of this embodiment is a cylindrical shape having a top part closed by a top face wall. Specifically, the measurement body part 40 includes a substantially cylindrical sidewall part 401 and a top face wall part 402 in which the plurality of the housing parts 400 are provided. The measurement body part 40 further includes a plurality of body ribs 403 which extend radially and downward and are aligned with each other in a circumferential direction (see FIG. 2) with gaps therebetween. The measurement body part 40 further includes an inlet defining part 404 that extends downward and defines the inlet 43. Each of the body ribs 403 forms an inclined surface extending upward as it advances toward the inlet defining part 404.

The plurality of the housing parts 400 are provided in the top face wall part 402 of the measurement body part 40 to be aligned in the circumferential direction of the sidewall part 401 (see FIG. 5). In the measurement body part 40 of this embodiment, the housing parts 400 are disposed in a substantially half-peripheral part of the top face wall part 402. Further, a top face wall opening 402a is provided at a central part of the top face wall part 402. Thus, the top face wall part 402 has an annular plate shape. Further, the top face wall part 402 forms an inclined surface extending downward as it advances toward the top face wall opening 402a.

Figure 8A:
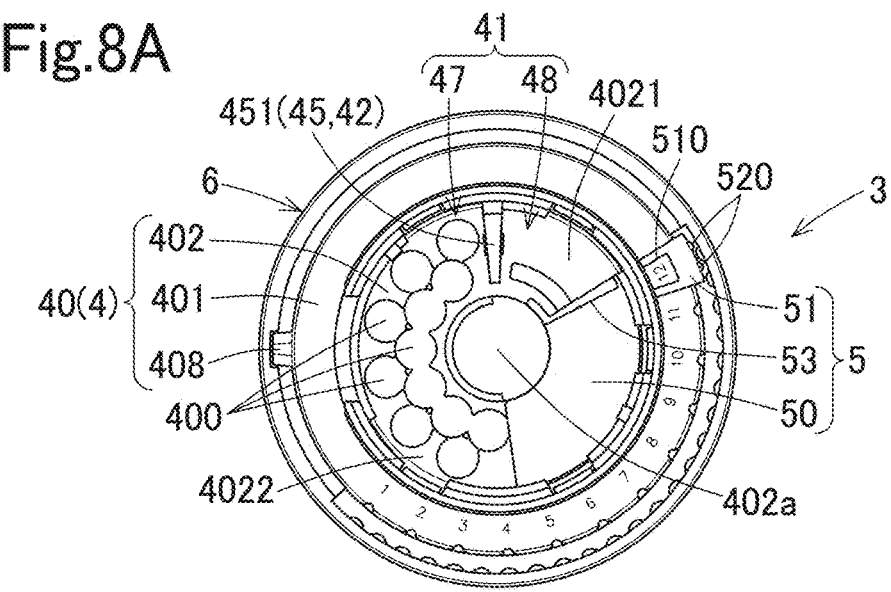
FIG. 8A is a schematic view for explaining a state where all of housing parts of the measuring device are available for housing.

Each of the housing parts 400 is in the form of at least one of a through hole and a recess. The housing parts 400 of this embodiment are, for example, recesses. Further, twelve housing parts 400 are provided in the top face wall part 402 as shown in FIG. 8A. The housing parts 400 are partially aligned with each other in the radial direction. The housing parts 400 adjacent to each other in the circumferential direction can be separated from each other or continuous with each other. The housing parts 400 adjacent to each other in the radial direction can be separated from each other or continuous with each other.

In the housing parts 400 of this embodiment, some (e.g., six) of the housing parts 400 are disposed on an inner peripheral side of the top face wall part 402 and the remaining housing parts 400 (e.g., six housing parts 400) are disposed on an outer peripheral side of the top face wall part 402. Specifically, some of the housing parts 400 are disposed on the inner peripheral side of the top face wall part 402 to be aligned in the circumferential direction and the remaining housing parts 400 are disposed on the outer peripheral side of the top face wall part 402 to be aligned in the circumferential direction.

The inlet defining part 404 has a substantially bottomed cylindrical shape (see FIG. 2). Specifically, the inlet defining part 404 includes a defining cylindrical part 405, a part of which is cut away (e.g., a half part in the circumferential direction), and a defining bottom part 406 provided at a bottom of the defining cylindrical part 405. The defining bottom part 406 extends inward in the circumferential direction from the lower end edge of the defining cylindrical part 405. The defining bottom part 406 has, for example, a disc shape.

First engagement parts 407 are provided on an outer peripheral surface of the sidewall part 401 of the measurement body part 40 to allow the measuring-number selecting part 5 to come into engagement with the first engagement parts 407 (see FIG. 5). Further, a second engagement part 408 is provided on the outer peripheral surface of the sidewall part 401 to allow the measuring-number fixing part 6 to come into engagement with the second engagement part 408. Moreover, a third engagement part 409 is provided on the outer peripheral surface of the sidewall part 401 to allow the measuring-number fixing part 6 to come into engagement with the third engagement part 409. Further, symbols representing numbers which correspond to the numbers measurable are represented (e.g., printed) side by side on a top of the sidewall part 401. A screw is provided on an inner peripheral surface of the sidewall part 401 to be ale to come into threaded engagement with the container screw part 201.

Each of the first engagement parts 407 of this embodiment is, for example, a groove extending in a vertical direction. A plurality of first engagement parts 407 are disposed on the outer peripheral surface of the sidewall part 401, for example, at equal intervals, and respectively disposed at positions corresponding to the representations of the measuring numbers. Further, the number of the first engagement parts 407 is the same as the number of the housing parts 400 (specifically, 12 housing parts). The first engagement parts 407 of this embodiment are disposed in a substantially half-peripheral part of the outer peripheral surface of the sidewall part 401. Further, the first engagement parts 407 are disposed in an area on a radially outward side of a first portion 4021, in which no housing parts 400 of the top face wall part 402 are provided.

The second engagement part 408 of this embodiment is a rib that protrudes in a radially outward direction. The number of the second engagement part 408 is, for example, one. Specifically, the second engagement part 408 has a lower part to come into engagement with the measuring-number fixing part 6. Further, the second engagement part 408 has an upper part to come into engagement with the overcap 7.

The third engagement part 409 of this embodiment is a rib that protrudes in the radially outward direction. The third engagement part 409 extends in the circumferential direction. Further, a pair of third engagement parts 409 are provided in the circumferential direction with the second engagement part 408 therebetween. The third engagement part 409 is disposed in an area on a radially outward side of a second portion 4022, in which the housing parts 400 of the top face wall part 402 are provided. Further, the third engagement part 409 is disposed at a substantially center part in the vertical direction of the outer peripheral surface of the sidewall part 401, and the third engagement part 409 has an upper part to come into engagement with the overcap 7.

Three or more of third engagement parts 409 can be disposed in the circumferential direction at intervals. Further, the third engagement part 409 can be disposed entirely in the circumferential direction of the outer peripheral surface of the sidewall part 401.

The measurement defining assembly 42 is a member that defines the measuring space 41 in cooperation with the measurement body part 40 (e.g., the top face wall part 402). Further, the measurement defining assembly 42 defines the measuring space 41 above the measurement body part 40 (e.g., the top face wall part 402). The measurement defining assembly 42 of this embodiment includes a first defining part 45 that defines a side of the measuring space 41 and a second defining part 46 that defines a top of the measuring space 41.

The first defining part 45 has, for example, a substantially cylindrical shape. Specifically, the first defining part 45 includes a defining cylindrical part 450 having a cylindrical shape and a defining extension part 451 extending from an inner peripheral surface of the defining cylindrical part 450 in a radially inward direction. The outlet 44 is formed in the first defining part 45 (e.g., in the defining cylindrical part 450) by partly cutting out an upper half in the circumferential direction of the first defining part 45 (e.g., the defining cylindrical part 450).

The second defining part 46 is a member that provides isolation or communication between the inside of the container body 2 and the measuring space 41. Further, the second defining part 46 is configured to open and close at least one of the inlet 43 and the outlet 44 through which the tablets are introduced in and discharged from the tablet measuring part 4. The second defining part 46 of this embodiment is configured to open and close both of the inlet 43 and the outlet 44.

The second defining part 46 of this embodiment has a substantially bottomed cylindrical shape. Further, the second defining part 46 can change its position between a take-out position at which the tablets can be taken out (see FIG. 7B) and a measuring position at which the tablets cannot be taken out (see FIG. 7A). Specifically, the second defining part 46 is rotatable relative to the measurement body part 40 around a cylindrical axis of the sidewall part 401 as a central axis, and this rotational movement enables the second defining part 46 to change its position between the take-out position and the measuring position. When the second defining part 46 is held at the take-out position, the second defining part 46 opens the outlet 44 while closing the inlet 43, and when the second defining part 46 is held at the measuring position, the second defining part 46 closes the outlet 44 while opening the inlet 43.

The second defining part 46 is, for example, a transparent member. Therefore, it is possible to visually observe through the second defining part 46 whether or not the tablets are housed in the housing parts 400 of the measurement body part 40.

The second defining part 46 of this embodiment has an outlet opening and closing part 460 that has a cylindrical shape and is configured to open and close the outlet 44 (see FIG. 5). Further, the second defining part 46 has a closing part 461 that closes the measuring space 41 from above, while closes a bottom of the outlet opening and closing part 460. Further, the second defining part 46 has a measurement engaging part 462 that extends upward from the closing part 461 and can engage with the overcap 7. Further, the second defining part 46 has an inlet opening and closing part 463 that extends downward from the closing part 461 and is configured to open and close the inlet 43.

Figure 10:
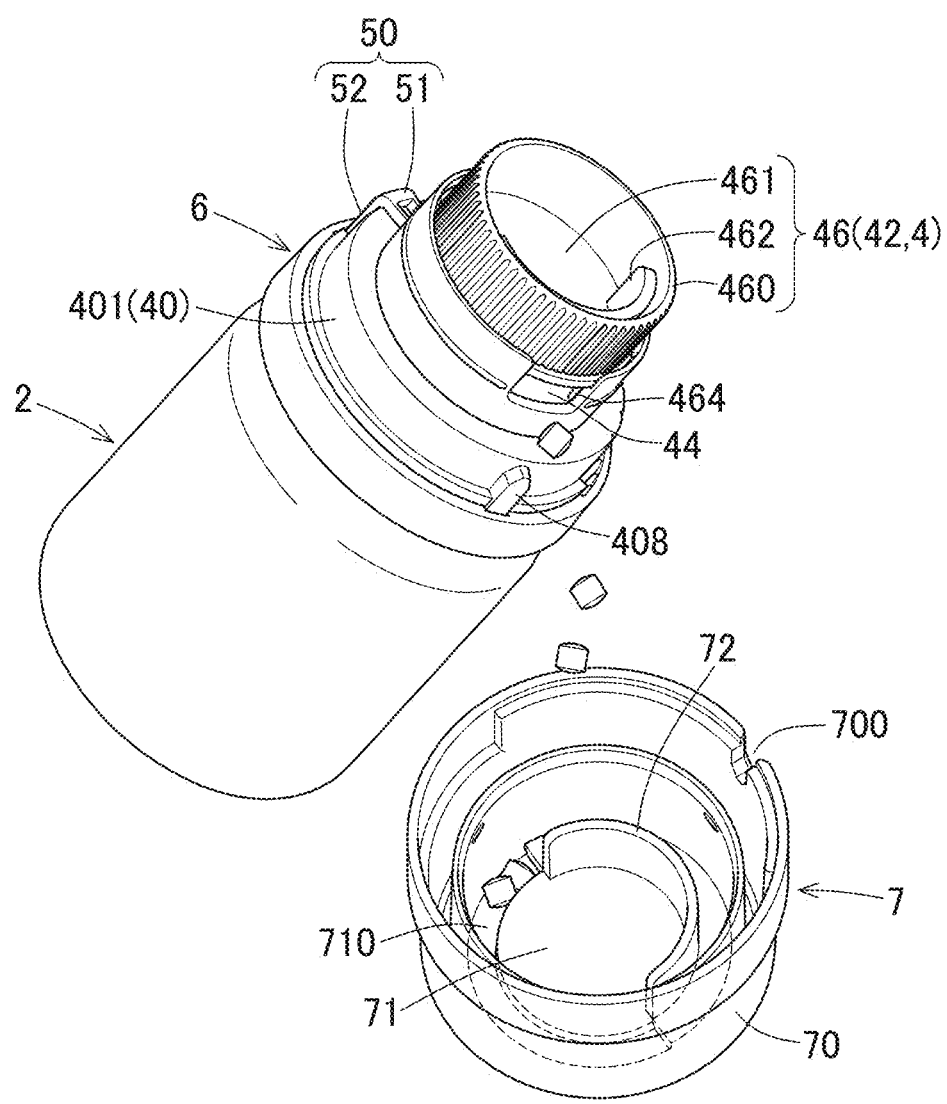
FIG. 10 is a schematic view for explaining an inner structure of the overcap.

As shown in FIG. 10, the outlet opening and closing part 460 has a cutout 464 formed by partially cutting out a lower half in the circumferential direction of the outlet opening and closing part 460. The cutout 464 has a shape and a size to enable itself to overlap with the outlet 44 of the tablet measuring part 4.

The closing part 461 is a disc-shaped member (see FIG. 5). Further, the closing part 461 extends from the inner peripheral surface of the outlet opening and closing part 460 in the radially inward direction.

The measurement engaging part 462 extends, for example, in the circumferential direction of the second defining part 46, while extending upward. Specifically, the measurement engaging part 462 is an arc-shaped rib when viewed from above. In other words, the measurement engaging part 462 has a cylindrical shape with a partial (e.g., half) cut in the circumferential direction.

In the second defining part 46 of this embodiment, the cutout 464 is disposed along a half circumference close to the measurement engaging part 462 in the outlet opening and closing part 460. Specifically, the cutout 464 is disposed on the outside of the central part in the circumferential direction of the measurement engaging part 462 in the outlet opening and closing part 460.

The inlet opening and closing part 463 extends, for example, in the circumferential direction of the second defining part 46, while extending downward. Specifically, the inlet opening and closing part 463 is an arc-shaped rib when viewed from below. In other words, the inlet opening and closing part 463 has a cylindrical shape with a partial (e.g., half) cut in the circumferential direction. The inlet opening and closing part 463 of this embodiment is located on the same side as the cutout 464 with respect to the central axis (e.g., a cylindrical axis of the second defining part 46). That is, the inlet opening and closing part 463 is disposed on a virtual line connecting the central axis of the second defining part 46 (e.g., a cylindrical axis of the second defining part 46) and the cutout 464 when viewed from above.

An outer diameter of the inlet opening and closing part 463 of this embodiment is slightly smaller than the outer diameter of the defining cylindrical part 405 of the measurement body part 40 (see FIG. 2). The inlet opening and closing part 463 is disposed inside (in the radially inward side) of the defining cylindrical part 405 in the state of being fitted into the top face wall opening 402a of the measurement body part 40.

The aforementioned second defining part 46 is, when it is located at the measurement position, disposed to have the cutout 464 not overlapping with the outlet 44 (specifically, to have the cutout 464 and the outlet 44 located on the sides opposite to each other with the central axis of the second defining part 46 therebetween) to thereby close the outlet 44 (see FIG. 7A). At this time, the second defining part 46 is disposed to have the inlet opening and closing part 463 not overlapping with the inlet 43 (specifically, to have the inlet opening and closing part 463 and the inlet 43 located on the sides opposite to each other with the central axis of the second defining part 46 therebetween) to thereby open the inlet 43.

Further, the second defining part 46 is, when it is located at the take-out position, disposed to have the cutout 464 overlapped with the outlet 44 to thereby open the outlet 44 (see FIG. 7B). At this time, the second defining part 46 is disposed to have the inlet opening and closing part 463 overlapped with the inlet 43 to thereby close the inlet 43. Further, the inlet defining part 404 including the defining bottom part 406 can reliably prevent the tablets from moving from the internal space of the housing body 21 into the measuring space 41.

Figure 8B:
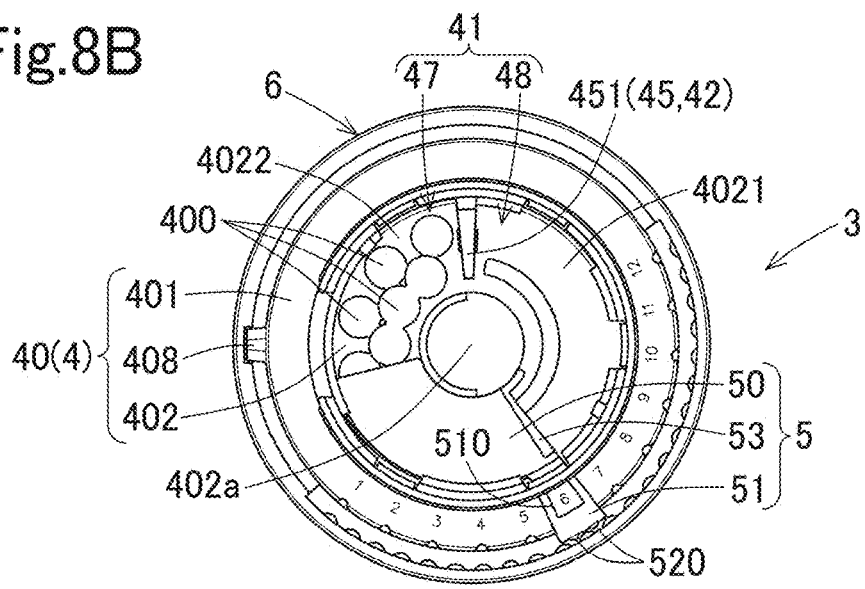
FIG. 8B is a schematic view for explaining a state where six housing parts of the measuring device are available for housing.
Figure 8C:
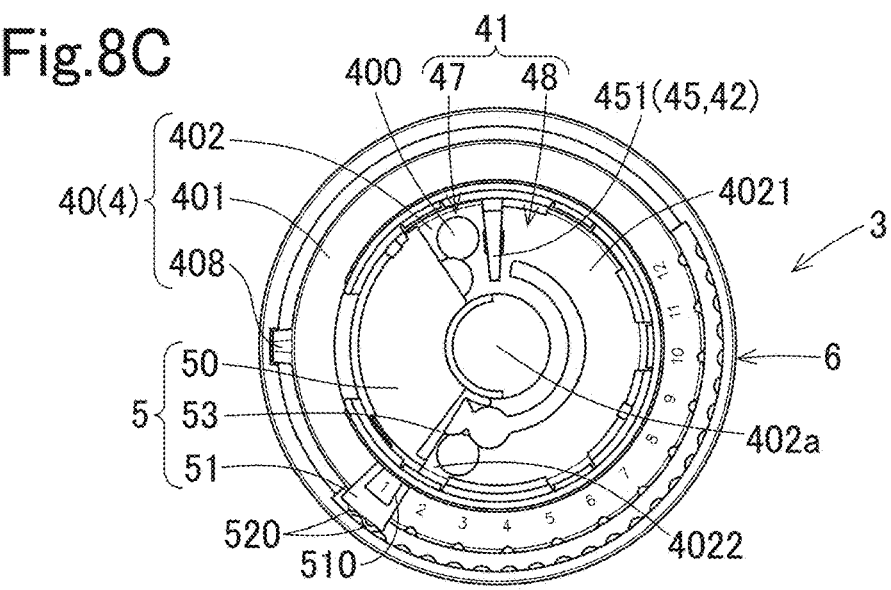
FIG. 8C is a schematic view for explaining a state where one housing part of the measuring device is available for housing.

As shown in FIG. 8A, FIG. 8B, and FIG. 8C, the measuring space 41 has a main measuring space 47 that allows the tablets to move thereinto and a spare measuring space 48 that does not allow the tablets to move thereinto. Further, the measuring space 41 is a substantially annular space when viewed from above. A part of the measuring space 41 of this embodiment is the main measuring space 47 and the remaining space is the spare measuring space 48.

The main measuring space 47 is located above at least a part of the second portion 4022 of the top face wall part 402, in which the second portion 4022 includes the housing parts 400. The spare measuring space 48 is located above at least a part of the first portion 4021 of the top face wall part 402, in which the first portion 4021 does not include the housing parts 400.

The measuring-number selecting part 5 enables to select the measuring number by selecting the number of the housing parts 400 available for housing in the plurality of the housing parts 400. The measuring-number selecting part 5 of this embodiment is configured to close the housing parts 400 that are not desired to house the tablets in the plurality of the housing parts, to thereby select the number of the housing parts 400 available for housing. Specifically, the measuring-number selecting part 5 is configured to select the number of the housing parts 400 available for housing by closing the housing parts 400 that are not desired to house the tablets in the plurality of the housing parts provided in the main measuring space 47.

Further, the measuring-number selecting part 5 is configured to move relative to the tablet measuring part 4 to select the measuring number. Specifically, the measuring-number selecting part 5 selects the measuring number by moving relative to the tablet measuring part 4 along the circumferential direction of the tablet measuring part 4.

As shown in FIG. 8A, the measuring-number selecting part 5 of this embodiment is configured to close none of the housing parts 400 to set the number of the housing parts 400 available for housing to the number of all of the housing parts 400 provided in the tablet measuring part 4. Further, as shown in FIG. 8B, the measuring-number selecting part 5 is configured to close the housing parts 400 provided in the main measuring space 47 except for some of them to set the number of the housing parts 400 available for housing to the number of those of the housing parts 400. Moreover, the measuring-number selecting part 5 is configured to close the housing parts 400 provided in the main measuring space 47 except for one housing part 400 to set the number of the housing parts 400 available for housing to one.

Further, the measuring-number selecting part 5 of this embodiment includes a selective closing part 50 that is located above the top face wall part 402 of the measurement body part 40 and can close the housing parts 400. Moreover, the measuring-number selecting part 5 moves relative to the tablet measuring part 4 along the circumferential direction of the tablet measuring part 4 to change the number of housing parts 400 to be closed, to thereby select the measuring number.

Moreover, the measuring-number selecting part 5 includes a selecting extension part 54 extending to the outside the measuring space 41 from the selective closing part 50 disposed in the measuring space 41 (see FIG. 5). Specifically, the measuring-number selecting part 5 includes a selecting operation part 51 that forms at least a part of the selecting extension part 54 and extends from the selective closing part 50 in the radially outward direction (e.g., in an outward direction of the measuring space 41). Further, the measuring-number selecting part 5 includes a selecting fixing part 52 that forms at least a part of the selecting extension part 54 and extends downward further from an extension end of the selecting operation part 51. Moreover, the measuring-number selecting part 5 includes a selecting wall part 53 provided in the selective closing part 50.

The selective closing part 50 is a plate-shaped member extending in the circumferential direction of the top face wall part 402. Further, the selective closing part 50 has a size and a shape to be able to close at least a part of the housing parts 400 (e.g., a part of housing parts 400 in the measuring-number selecting part 5 of this embodiment) provided in the tablet measuring part 4. Specifically, the selective closing part 50 has an annular plate shape that is partly cut out in the circumferential direction.

The selecting extension part 54 is a member that is engaged with the measuring-number fixing part 6 to fix the measuring number selected by the measuring-number selecting part 5. Further, the selecting extension part 54 extends along the outer peripheral surface of the sidewall part 401 of the measurement body part 40. The selecting extension part 54 of this embodiment includes the selecting operation part 51 and the selecting fixing part 52.

The selecting operation part 51 is, for example a lever to be operated for selection of the measuring number. Specifically, a protrusion is provided inside the lever. When the measuring-number selecting part 5 of this embodiment moves relative to the tablet measuring part 4 to follow the number of the tablets according to the prescription, the protrusion provided inside the lever is engaged with each of the first engagement parts 407 of the measurement body part 40. This protrusion engagement makes it possible to obtain click feeling, which facilitates position adjustment of the lever.

A display window 510 for allowing the measuring number (e.g., the measuring number displayed (printed) on the sidewall part 401) to be displayed therethrough is provided in the selecting operation part 51 of this embodiment. When the display window 510 displays a specific measuring number, the selective closing part 50 allows the number of the housing parts 400 corresponding to this specific measuring number to open.

Figure 4:
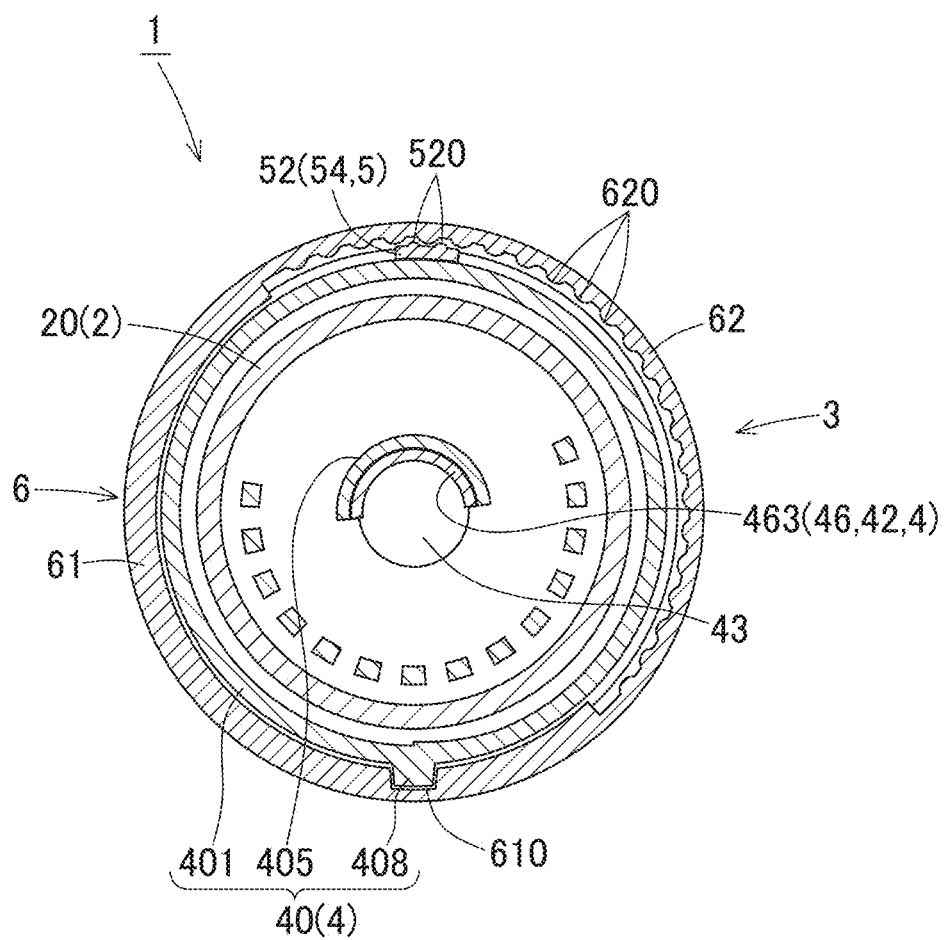
FIG. 4 is a cross section viewed in the direction of the arrows IV-IV in FIG. 1A.

The selecting fixing part 52 can engage with the measuring-number fixing part 6. The selecting fixing part 52 of this embodiment has fixing protrusions 520 protruding in the radially outward direction as shown in FIG. 4, as engaging parts that can engage with the measuring-number fixing part 6. For example, a pair of the fixing protrusions 520 are aligned in the circumferential direction.

The selecting wall part 53 extends in the radially outward direction (specifically, from an inner edge to an outer edge of the selective closing part 50), while extending upward from the selective closing part 50 (see FIG. 5). Further, the selecting wall part 53 partitions between the main measuring space 47 and the spare measuring space 48 in cooperation with the defining extension part 451 and the inlet opening and closing part 463. Moreover, the position at which the main measuring space 47 and the spare measuring space 48 are partitioned is changed to change the sizes of the both spaces.

The measuring-number fixing part 6 of this embodiment is configured to be attached to the tablet measuring part 4 to restrict movement of the measuring-number selecting part 5, to thereby fix the measuring number. Further, the measuring-number fixing part 6 is configured to be attached to the tablet measuring part 4 in a state where the measuring-number fixing part 6 engages with the measuring-number selecting part 5 and immovably engages with the tablet measuring part 4, to thereby restrict the selection of the measuring number by the measuring-number selecting part 5. Moreover, the measuring-number fixing part 6 is configured to be disposed between the tablet measuring part 4 and the container body 2 in a state where the tablet measuring part 4 is attached to the container body 2 (see FIG. 2 and FIG. 3).

Figure 6:
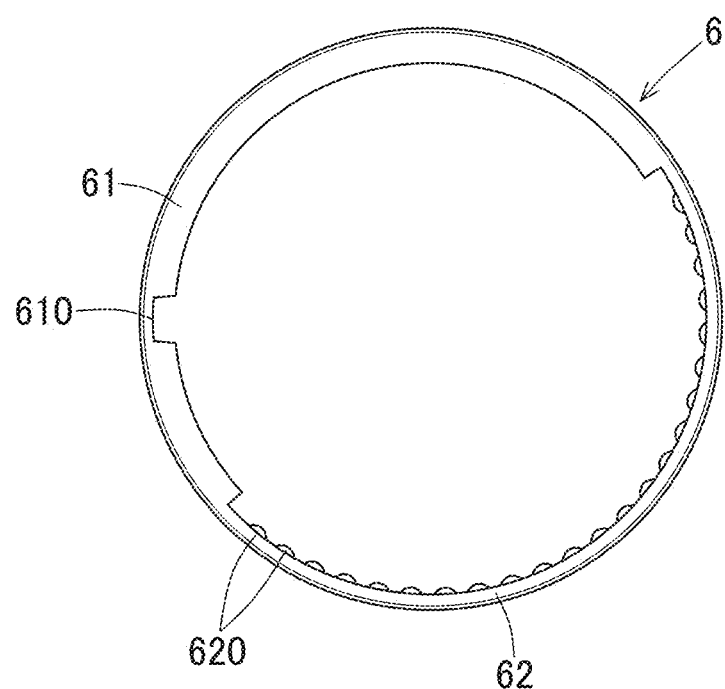
FIG. 6 is a plan view of a fixing ring with the measuring device.

As shown in FIG. 4 and FIG. 6, the measuring-number fixing part 6 has a ring shape (e.g., an annular shape). Further, the measuring-number fixing part 6 restricts rotational movement of the measuring-number selecting part 5 relative to the tablet measuring part 4. Moreover, the measuring-number fixing part 6 non-rotatably engages with the tablet measuring part 4. The measuring-number fixing part 6 of this embodiment is fitted around the tablet measuring part 4 and engages therewith to be thereby non-rotatably fitted to the tablet measuring part 4.

The thickness in the radial direction of the measuring-number fixing part 6 of this embodiment is not uniform. In the measuring-number fixing part 6, a first fixing area 61 that is a part thereof in the circumferential direction has a large thickness, and a second fixing area 62 that is the remaining area in the circumferential direction has a small thickness.

Further, the measuring-number fixing part 6 has a first fixing portion 610 that fits to the sidewall part 401 (e.g., the second engagement part 408) of the measurement body part 40 to come into locking engagement with the sidewall part 401 (see FIG. 4). Moreover, the measuring-number fixing part 6 has a second fixing portion 620 that fits to the selecting extension part 54 (e.g., the selecting fixing part 52 (specifically, each of the fixing protrusions 520)) of the measuring-number selecting part 5 for locking engagement.

Moreover, the first fixing portion 61 comets into locking engagement with the measurement body part 40 to thereby restrict the rotational movement of the measuring-number fixing part 6 relative to the measurement body part 40. In this state, the second fixing portion 620 comes into locking engagement with the selecting extension part 54 of the measuring-number selecting part 5 to thereby lock the rotational movement of the measuring-number selecting part 5.

The aforementioned measuring device 3 includes the measurement body part 40 that is provided with the plurality of the housing parts 400 and the measurement defining assembly 42 that defines the measuring space 41 in cooperation with the measurement body part 40 (see FIG. 5). Further, the measuring-number selecting part 5 includes the selective closing part 50 that is disposed inside the measuring space 41 and can close the housing parts 400, and the selecting extension part 54 that extends from the selective closing part 50 to the outside of the measuring space 41. Moreover, the measuring-number fixing part 6 comes into locking engagement with the selecting extension part 54, while coming engagement with the measurement body part 40, to thereby restrict movement of the measuring-number selecting part 5. Further, the selecting extension part 54 extends along the outer peripheral surface of the measurement body part 40, and the measuring-member fixing part 6 comes into locking engagement with the outer peripheral surface of the measurement body part 40 while coming into locking engagement with the selecting extension part 54 on the outer peripheral surface, to thereby restrict movement of the measuring-number selecting part 5.

The overcap 7 is a member that protects the tablet measuring part 4 and the like, and serves as a tray for receiving the tablets taken out from the measuring space 41. Further, the overcap 7 can fit to the second defining part 46 set at the measuring position and cannot fit to the second defining part 46 set at the take-out position.

The overcap 7 of this embodiment has a cylindrical shape with a top closed by a top face wall. Specifically, the overcap 7 includes a cap cylindrical part 70 having a substantially cylindrical shape, and a cap top plate 71. Further, the overcap 7 includes a cap extension part 72 extending from an inner surface of the cap top plate 71.

The cap cylindrical part 70 is a portion that protects the side portion of the tablet measuring part 4. In the cap cylindrical part 70, a cylindrical-part engaging part 700 that can engage with the side portion (e.g., the second engagement part 408 of the measurement body part 40) of the tablet measuring part 4 is formed by partly cutting out an lower portion in the circumferential direction of the cap cylindrical part 70.

The cap top plate 71 is a portion that protects a top of the tablet measuring part 4. In the cap top plate 71, as shown in FIG. 10, a measurement groove 710 that enables simple and easy measurement of the number of tablets when used as a tray is provided.

The measurement groove 710 is disposed on an inner surface of the cap top plate 71. Further, the measurement groove 710 extends in the circumferential direction. Specifically, the measurement groove 710 extend in an arc shape. Note that the measurement groove 710 can be disposed on the outer side of the cap top plate 71.

The cap extension part 72 can engage with the top (e.g., the measurement engaging part 462 of the measurement defining assembly 42) of the tablet measuring part 4 (see FIG. 5). Further, the cap extension part 72 extends, for example, in the circumferential direction of the cap cylindrical part 70, while extending downward. Specifically, the cap extension part 72 is a rib having the same shape and the same size as those of the measurement engaging part 462 when viewed from above.

Moreover, the cap extension part 72 is configured to be able to interfere with the tablet measuring part 4 in a state where tablets can be taken out therefrom. Specifically, since the cap extension part 72 does not interfere with the second defining part 46 (e.g., the measurement engaging part 462) located at the measuring position as shown in FIG. 9A, the overcap 7 can fit to the second defining part 46. At this time, since the cap extension part 72 interferes with the second defining part 46 (e.g., the measurement engaging part 462) located at the take-out position as shown in FIG. 9B, the overcap 7 cannot fit to the second defining part 46.

Next, one form of the usage of the measuring device 3 will be described.

First, a pharmacist or other pharmacy personnel prepares the measuring device 3, in which the measuring number is fixed on the basis of the prescription. For example, the pharmacist selects the measuring number in the measuring device 3 by selecting the number of the housing parts 400 available for housing out of the plurality of the housing parts 400 using the measuring-number selecting part 5 (see FIG. 8A to FIG. 8C). Specifically, the selecting operation part 51 is operated to move the selective closing part 50 to set the number of the housing parts 400 to be closed by the selective closing part 50 to correspond to the measuring number according to the prescription. More specifically, the selective closing part 50 is moved to allow the number seen through the display window 510 of the selecting operation part 51 to be the number corresponding to the measuring number according to the prescription. For example, on the basis of the prescription, for example, "6 tablets per dose to be administered only in morning for 5 days", the pharmacist moves the selective closing part 50 to set the number seen through the display window 510 of the selecting operation part 51 to be the number corresponding to "6" which is the measuring number according to the prescription (see FIG. 8B).

Next, the pharmacist puts a plurality of tablets into the container body 2 on the basis of the prescription. For example, the pharmacist puts 30 tablets into the container body 2 on the basis of the aforementioned prescription.

Further, the pharmacist sets the measuring-number fixing part 6 between the container body 2 and the tablet measuring part 4. Specifically, the tablet measuring part 4 with the measuring-number fixing part 6 attached thereto is connected with the container body 2. In a state where the measuring-number fixing part 6 is arranged between the container body 2 and the tablet measuring part 4, the upper limit position of the measuring-number fixing part 6 is set by the third engagement part 409 of the tablet measuring part 4 and the lower limit position of the measuring-number fixing part 6 is set by the shoulder part 210 of the container body 2. Thus, the measuring-number fixing part 6 is prevented from falling off (see FIG. 3). Moreover, the measuring-number in the measuring-number selecting part 5 is not changed unless the measuring-number fixing part 6 is removed.

Lastly, the pharmacist attaches the overcap 7 to the measuring device 3 in a state where the second defining part 46 is located at the measuring position.

At the time of administration of tablets by a user such as a patient, the overcap 7 is removed from the measuring device 3, followed by placing upside down the container with the measuring device 1 (i.e., the container body 2 with the measuring device 3 attached thereto). Accordingly, the tablets move from the container body 2 into the measuring space 41 via the inlet 43. Then, when the user returns the container with the measuring device 1 to the original posture and shakes it laterally, excess tablets not entering the housing parts 400 return from the inlet 43 to the container body 2 so that the only the number of tablets fixed in the housing parts are measured. The user can see the measuring number through the transparent second defining part 46.

Upon confirmation that the tablets have been measured, the user opens the outlet 44 of the tablet measuring part 4, while closing the inlet 43 of the tablet measuring part 4 (see FIG. 9B). By keeping this state, the user can take out the tablets that have been measured from the container with the measuring device 1. Since the overcap 7 also serves as a tray in the container with the measuring device 1 of this embodiment, it is possible to prevent the tablets from getting wet by taking the tablets that have been measured on hand, without the necessity to separately prepare the tray (see FIG. 10).

According to the aforementioned measuring device 3, the measuring number can be selected by the measuring-number selecting part 5. In addition, the measuring-number fixing part 6 that locks the measuring-number selecting part 5 to prevent the measuring number of tablets selected by the measuring-number selecting part 5 from being changed. Thus, for example, when the tablets are dispensed, it is possible to restrict the user's operation of the measuring-number selecting part 5, and therefore it is possible for the user to measure an appropriate number of tablets and take the appropriate number of tablets by selecting the measuring number on the basis of the prescription by the measuring-number selecting part 5 and then fixing the selected measuring number by the measuring-number fixing part 6.

In the container with the measuring device 1 of this embodiment, the measuring-number fixing part 6 is fixed between the tablet measuring part 4 and the container body 2. Therefore, it is unlikely that the restriction of the position applied to the measuring-number selecting part 5 is released by mistake, and this configuration enables the user to reliably take the appropriate number of tablets. Furthermore, the measuring-number fixing part 6 hardly falls off from the tablet measuring part 4 in the container with the measuring device 1 of this embodiment.

It is a matter of course that the container according to the present invention is not necessarily limited to the above embodiment, and can be appropriately modified without departing from the gist of the present invention. For example, a configuration of one embodiment can incorporate a configuration of other embodiment. Alternatively, a part of the configuration of one embodiment can be replaced with the configuration of other embodiment. Moreover, the configuration of one embodiment can be partly eliminated.

The container with the measuring device 1 of the above embodiment can be configured such that, when connection of the container body 2 and the tablet measuring part 4 has been completed, the connection cannot be released. Specifically, a stopper that fixes the container body 2 and the tablet measuring part 4 at a position, at which the connection of the container screw part 201 and a screw in the inner peripheral surface of the sidewall part 401 of the measuring body 40 is completed, can be provided. In this case, the restriction on the measuring-number selecting part 5 is not released by mistake since the tablet measuring part 4 is unable to be removed from the container body 2.

Figure 11:
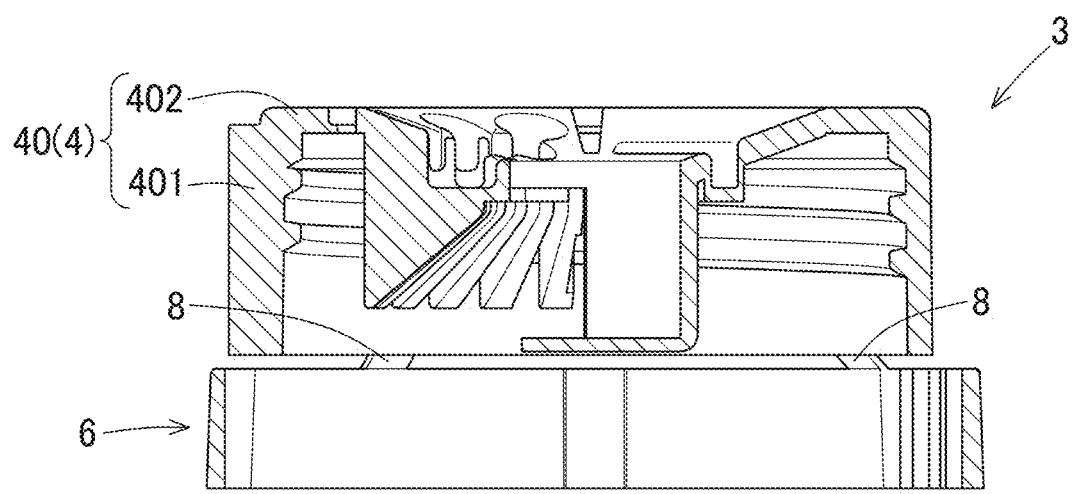
FIG. 11 is an enlarged cross section of the container with the measuring device according to a modified embodiment.

In the container with the measuring device 1 of the above embodiment, the tablet measuring part 4 and the measuring-number fixing part 6 are separately provided, but can be integrally formed with each other by being connected with each other by breakable bridges 8, as shown in FIG. 11. The bridges 8 of this embodiment extend from the lower end of the measurement body part 40 (e.g., the sidewall part 401). In this case, the measuring-number fixing part 6 does not fall off from the tablet measuring part 4. Further, the user is not required to take actions other than pressing the tablet measuring part 4 from above in assembling the tablet measuring part 4 and the measuring-number fixing part 6, which enables easy assembling.

Figure 12:
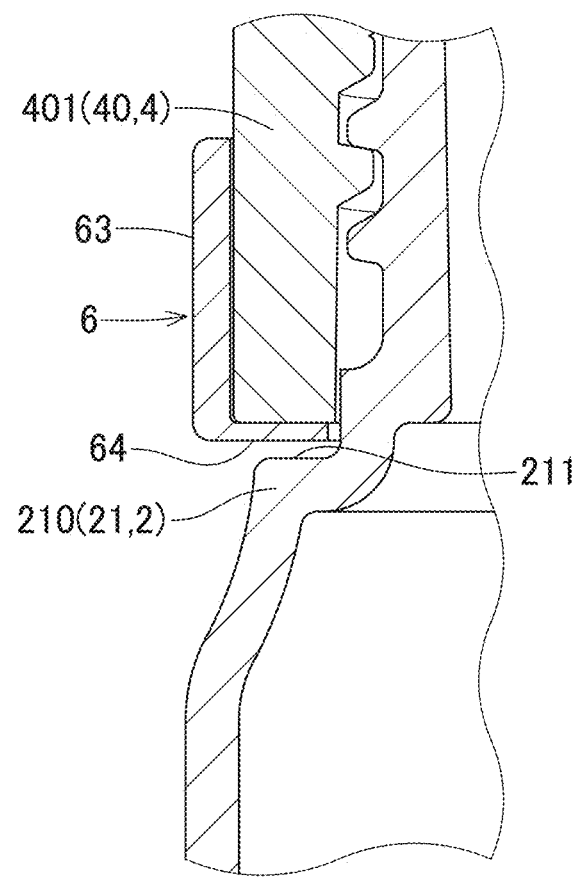
FIG. 12 is an enlarged cross section of the container with the measuring device according to a modified embodiment.

In the container with the measuring device 1 of the above embodiment, the third engagement part 409 that is a rib extending in the radially outward direction of the measuring-number fixing part 6 is disposed between the tablet measuring part 4 and the container body 2, but a different part of the measuring-number fixing part 6 can be disposed between the tablet measuring part 4 and the container body 2. For example, as shown in FIG. 12, the lower end of the measuring-number fixing part 6 can be disposed between the tablet measuring part 4 and the container body 2. Specifically, it is conceivable that the measuring-number fixing part 6 includes a fixing body part 63 that extends in the vertical direction and a fixing extension part 64 that extends in the radially inward direction from an inner peripheral surface (e.g., the lower end edge of the inner peripheral surface of the fixing body part 63) of the fixing body part 63. The fixing extension part 64 is disposed between the tablet measuring part 4 (e.g., the sidewall part 401 of the measurement body part 40) and the container body 2 (e.g., the shoulder part 210 of the container body 2).

In the container with the measuring device 1 of the above embodiment, the measuring-number fixing part 6 is disposed between the tablet measuring part 4 and the container body 2 so that the upper limit position of the measuring-number fixing part 6 is set by the tablet measuring part 4 and the lower limit position of the measuring-number fixing part 6 is set by the container body 2. However, the measuring-number fixing part 6 can be, for example, fixed between the tablet measuring part 4 and the container body 2. Specifically, the fixing extension part 64 can be sandwiched between the lower end edge of the sidewall part 401 and the upper surface 211 of the shoulder part 210 of the container body 2. That is, the thickness (i.e., the dimension in the vertical direction) of the fixing extension part 64 can be substantially the same as the dimension between the lower end edge of the sidewall part 401 and the upper surface 211 of the shoulder part 210 of the container body 2. Also even in this case, the restriction on the measuring-number selecting part 5 is hardly released by mistake, and this configuration enables the user to reliably take the appropriate number of tablets.

The measuring-number fixing part 6 can be fixed between the tablet measuring part 4 and the container body 2 by being bonded to at least one of the tablet measuring part 4 and the container body 2.

Figure 13:
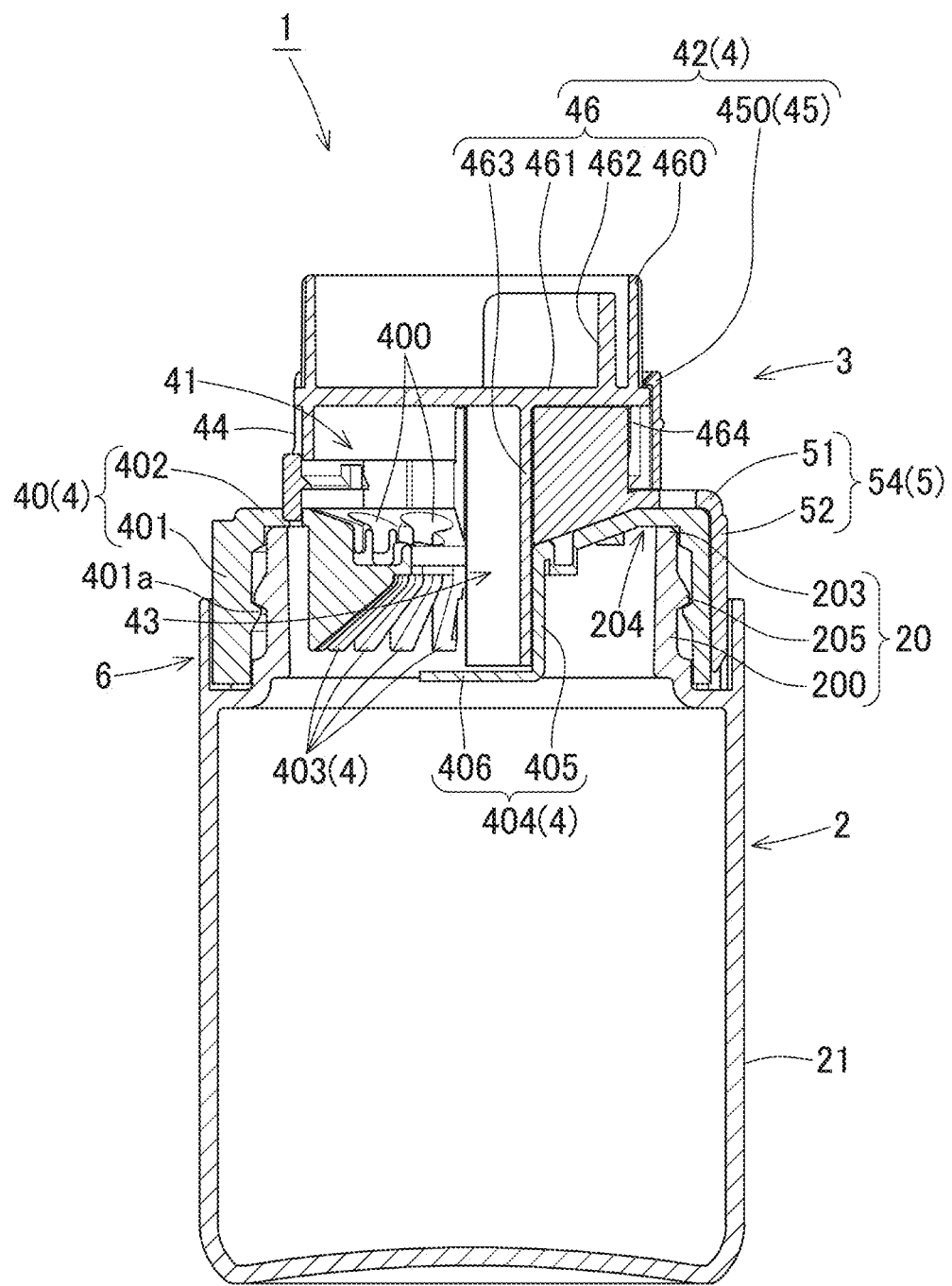
FIG. 13 is a cross section of the container with the measuring device according to a modified embodiment.
Figure 14:
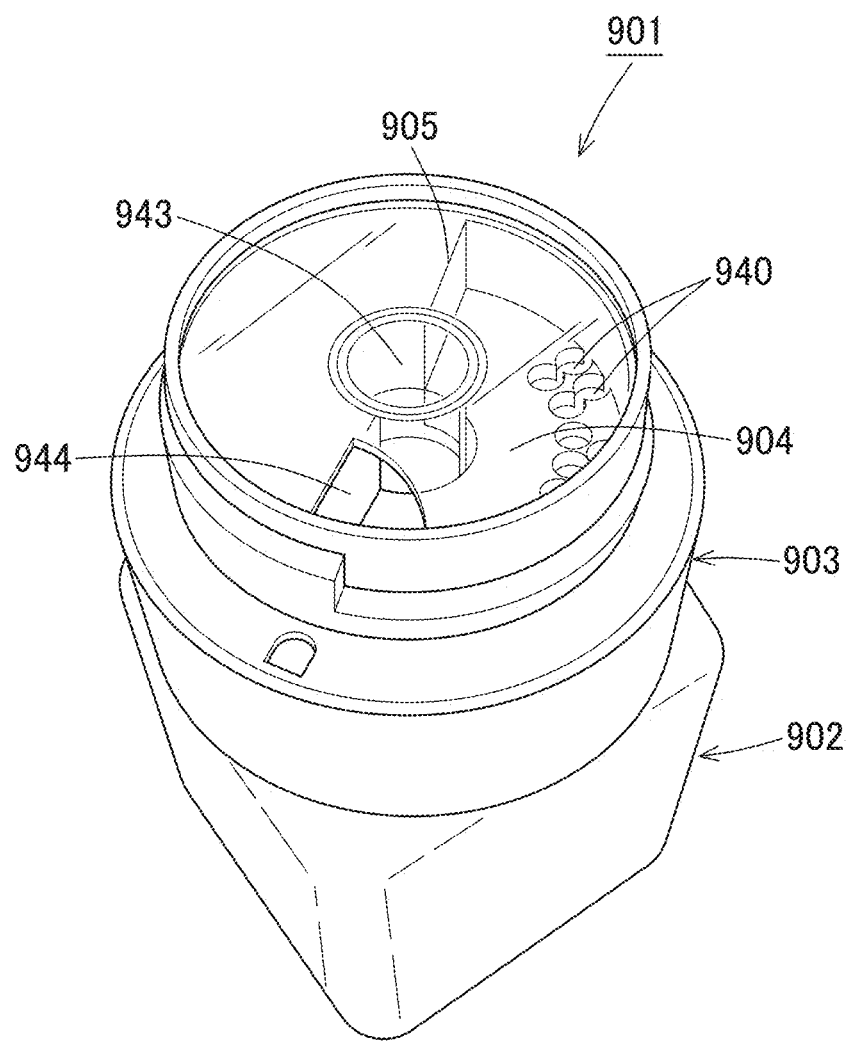
FIG. 14 is a schematic view of the conventional medicine housing device.

In the container with the measuring device 1 of the above embodiment, the measuring device 3 includes the measuring-number fixing part 6, but it can be configured such that the container body 2 includes the measuring-number fixing part 6. Specifically, as shown in FIG. 13, it can be configured such that the container with the measuring device 1 includes the measuring device 3 that measures the tablets and the container body 2 that has the measuring device 3 attached thereto and houses the tablets, and that the container body 2 includes the measuring-number fixing part 6 that locks the measuring-number selecting part 5 to prevent the measuring number selected by the measuring-number selecting part 5 from being changed. In this case, the measuring device 3 includes the tablet measuring part 4 provided with the plurality of the housing parts 400 that respectively house the tablets to measure the number of the tablets, and the measuring-number selecting part 5 that enables to select the measuring number of the tablets by selecting the number of the housing parts 400 in open state out of the plurality of the housing parts 400. In the container with the measuring device 1, the measuring-number fixing part 6 is disposed to, for example, surround the mouth 20 of the container body 2.

Also in this configuration, in addition to the measuring-number selecting part 5 that enables to select the measuring number, the measuring-number fixing part 6 that locks the measuring-number selecting part 5 to prevent the selection of the measuring number of the tablets selected by the measuring-number selecting part 5 from being changed. Thus, for example, when the tablets are dispensed, it is possible to restrict the user's operation of the measuring-number selecting part 5, and it is possible for the user to measure an appropriate number of tablets and take the appropriate number of tablets by selecting the measuring number on the basis of the prescription, and then fixing the selected measuring number by the measuring-number fixing part 6.

In the container with the measuring device 1, a circumferential protrusion 205 provided on an outer surface of the mouth 20 of the container body 2 comes into locking engagement with a circumferential protrusion 401a provided on an inner surface of the sidewall part 401 of the measurement body part 40, so that the container body 2 and the measurement body part 4 are fitted to each other. Thereby, the tablet measuring part 4 cannot be removed from the container body 2 after the container body 2 and the measurement body part 4 are once fitted to each other, to thereby prevent the measuring number from being changed.

The measuring device 3 can be formed without including at least one of the measurement defining assembly 42, the second defining part 46, the overcap 7, and the like, as long as the measuring device 3 includes a portion to be provided with the housing parts 400 in the tablet measuring part 4, the measuring-number selecting part 5, and the measuring-number fixing part 6.

The container body 2 of the above embodiment is a tall bottle, but can be ajar container with a low height, and can be a flat container or a compact container.

According to the present invention, it is possible to provide a measuring device and a container with the measuring device that make it possible to select the number of tablets such as medicines in a tablet form to be measured and allow a user to follow the dosage by taking the appropriate number of tablets.

The measuring device of the present invention includes: a tablet measuring part that includes a plurality of housing parts that are each configured to house one tablet; a measuring-number selecting part that enables to select the number of tablets to be measured by selecting the number of the housing parts available for housing tablets out of the plurality of the housing parts; and a measuring-number fixing part that is configured to lock the measuring-number selecting part to prevent the measuring number selected by the measuring-number selecting part from being changed.

According to this configuration, in addition to the measuring-number selecting part that enables to select the number of tablets to be measured, the measuring-number fixing part that locks the measuring-number selecting part to prevent the measuring number of tablets selected by the measuring-number selecting part from being changed. Thus, for example, when the tablets are dispensed, it is possible to restrict the user's operation of the measuring-number selecting part, and therefore it is possible for the user to measure an appropriate number of tablets and take the appropriate number of tablets by selecting the measuring number on the basis of the prescription, and then fixing the selected measuring number by the measuring-number fixing part.

The measuring device can be configured such that the measuring-number selecting part moves relative to the tablet measuring part to select the measuring number, and the measuring-number fixing part is attached to the tablet measuring part to restrict movement of the measuring-number selecting part to thereby fix the measuring number.

According to this configuration, in addition to the measuring-number selecting part that moves to enable to select the measuring number of tablets, the measuring-number fixing part restricts movement of the measuring-number selecting part to prevent the measuring number of tablets from being changed. Thus, it is possible for the user to measure an appropriate number of tablets and therefore take the appropriate number of tablets.

The measuring device can be configured such that the measuring-number fixing part is configured to be attached to the tablet measuring part while being held in engagement with the measuring-number selecting part and being held in immovable engagement with the tablet measuring part, to thereby restrict the selection of the measuring number by the measuring-number selecting part.

According to this configuration, the measuring-number fixing part that is engaged with the measuring-number selecting part and attached to the tablet measuring part restricts the number of tablets selected by the measuring-number selecting part. Thus, it is possible for the user to reliably measure an appropriate number of tablets and take the appropriate number of tablets.

The measuring device can be configured such that the tablet measuring part is attached to a container body that houses tablets, and the measuring-number fixing part is disposed between the tablet measuring part and the container body in a state where the tablet measuring part is attached to the container body.

According to this configuration in which the measuring-number fixing part is disposed between the tablet measuring part and the container body, the restriction on the measuring-number selecting part is hardly released by mistake. Thus, it is possible for the user to reliably take an appropriate number of tablets.

A container with a measuring device of the present invention includes: a container body that houses tablets; and a measuring device that is attached to the container body, in which this measuring device is the measuring device described above.

According to this configuration, in addition to the measuring-number selecting part that enables to select the measuring number, the measuring-number fixing part that locks the measuring-number selecting part to prevent the selection in the measuring number of the tablets by the measuring-number selecting part from being changed, for example, when the tablets are dispensed, it is possible to restrict the user's operation of the measuring-number selecting part, and therefore it is possible for the user to measure an appropriate number of tablets and take the appropriate number of tablets by selecting the measuring number on the basis of the prescription, and then fixing the selected measuring number by the measuring-number fixing part.

A container with a measuring device of the present invention includes: a measuring device that measures tablets; and a container body that is attached with the measuring device and house tablets, the measuring device including a plurality of housing parts that are each configured to house one tablet, and a measuring-number selecting part that enables to select a measuring number of tablets by selecting the number of housing parts in open state out of the plurality of the housing parts, and the container body including a measuring-number fixing part that locks the measuring-number selecting part to prevent the measuring number selected by the measuring-number selecting part from being changed.

According to this configuration, in addition to the measuring-number selecting part that enables to select the measuring number, the measuring-number fixing part that locks the measuring-number selecting part to prevent the selection of the measuring number of the tablets selected by the measuring-number selecting part from being changed. Thus, for example, when the tablets are dispensed, it is possible to restrict the user's operation of the measuring-number selecting part, and therefore it is possible for the user to measure an appropriate number of tablets and take the appropriate number of tablets by selecting the measuring number on the basis of the prescription, and then fixing the selected measuring number by the measuring-number fixing part.

REFERENCE SIGNS LIST

1: Container
2: Container body
3: Measuring device
4: Tablet measuring part
5: Measuring-number selecting part
6: Measuring-number fixing part
7: Overcap
20: Mouth
21: Housing body
40: Measurement body part
41: Measuring space
42: Measurement defining assembly
43: Inlet
44: Outlet
45: First defining part
46: Second defining part
47: Main measuring space
48: Spare measuring space
50: Selecting closing part
51: Selecting operation part
52: Selecting fixing part
53: Selecting wall part
54: Selecting extension part
61: First fixing area
62: Second fixing area
63: Fixing body part
64: Fixing extension part
70: Cap cylindrical part
71: Cap cylindrical part
72: Cap extension part
8: Bridge
200: Mouth body
201: Container screw
203: End edge
204: Opening
205: Circumferential protrusion
210: Shoulder part
211: Upper surface
400: Housing part
401: Sidewall part
401a: Circumferential protrusion
402: Top face wall part
402a: Top face wall opening
403: Body rib
404: Inlet defining part
405: Defining cylindrical part
406: Defining bottom part
407: First engagement part
408: Second engagement part
409: Third engagement part
450: Defining cylindrical part
451: Defining extension part
460: Outlet opening and closing part
461: Closing part
462: Measurement engaging part
463: Inlet opening and closing part
464: Cutout
510: Display window
520: Fixing protrusion
610: First fixing portion
620: Second fixing portion
700: Cylindrical-part engaging part
710: Measurement groove
901: Medicine housing device
902: Container body
903: Dispensing device
904: Chamber
905: Movable baffle
940: Holding section
943: Inlet
944: Outlet
4021: First portion
4022: Second portion

The invention claimed is:
1. A measuring device comprising:
a tablet measuring part that comprises a plurality of housing parts that are each configured to house one tablet;
a measuring-number selecting part that is configured for selecting a number of one or more tablets to be measured by selecting a number of housing parts available for housing tablets out of the plurality of the housing parts; and
a measuring-number fixing part that is configured to lock the measuring-number selecting part to prevent the number selected by the measuring-number selecting part from being changed, wherein the tablet measuring part has an inlet through which the one or more tablets enter, and comprises a substantially cylindrical sidewall part and a top face wall part in which the plurality of the housing parts are provided, the plurality of the housing parts are provided in the top face wall part to be aligned in a circumferential direction of the sidewall part, a top face wall opening continued with the inlet is provided at a central part of the top face wall part, and the top face wall part forms an inclined surface extending downward as it advances toward the top face wall opening.

2. The measuring device according to claim 1, wherein the measuring-number selecting part is configured to move relative to the tablet measuring part to select the number, and the measuring-number fixing part is configured to be attached to the tablet measuring part to restrict movement of the measuring-number selecting part to thereby fix the number.

3. The measuring device according to claim 1, wherein the measuring-number fixing part is configured to be attached to the tablet measuring part while being held in engagement with the measuring-number selecting part and being held in immovable engagement with the tablet measuring part, to thereby restrict the selection of the number by the measuring-number selecting part.

4. The measuring device according to claim 1, wherein the tablet measuring part is configured to be attached to a container body that houses tablets, and the measuring-number fixing part is disposed between the tablet measuring part and the container body in a state where the tablet measuring part is attached to the container body.

5. A container with a measuring device comprising:

a container body that houses tablets; and a measuring device that is attached to the container body, wherein the measuring device is the measuring device according to claim 1.

6. A container with a measuring device comprising:

a measuring device that measures tablets; and a container body that is attached with the measuring device and houses tablets, the measuring device comprising a plurality of housing parts that are each configured to house one tablet, and a measuring-number selecting part that is configured for selecting a number of one or more tablets to be measured by selecting a number of housing parts out of the plurality of the housing parts, and the container body comprising a measuring-number fixing part that is configured to lock the measuring-number selecting part to prevent the number selected by the measuring-number selecting part from being changed, wherein the measuring-number selecting part comprises a selective closing part that can close the housing parts, the measuring device has an inlet through which the one or more tablets enter from the container body, and comprises a substantially cylindrical sidewall part and a top face wall part in which the plurality of the housing parts are provided, the plurality of the housing parts are provided in the top face wall part to be aligned in a circumferential direction of the sidewall part, a top face wall opening continued with the inlet is provided at a central part of the top face wall part, and the top face wall part forms an inclined surface extending downward as it advances toward the top face wall opening.

* * * * *